United States Patent
Mandal et al.

(10) Patent No.: US 11,902,451 B2
(45) Date of Patent: Feb. 13, 2024

(54) CROSS-BLOCKCHAIN IDENTITY AND KEY MANAGEMENT

(71) Applicant: FUJITSU LIMITED, Kawasaki (JP)

(72) Inventors: Avradip Mandal, San Jose, CA (US); Hart Montgomery, Redwood City, CA (US); Arnab Roy, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 280 days.

(21) Appl. No.: 17/365,873

(22) Filed: Jul. 1, 2021

(65) Prior Publication Data

US 2023/0006835 A1  Jan. 5, 2023

(51) Int. Cl.
| | | |
|---|---|---|
| *H04L 9/08* | (2006.01) | |
| *H04L 9/14* | (2006.01) | |
| *H04L 9/32* | (2006.01) | |
| *H04L 9/00* | (2022.01) | |

(52) U.S. Cl.
CPC ............ *H04L 9/3247* (2013.01); *H04L 9/085* (2013.01); *H04L 9/0866* (2013.01); *H04L 9/14* (2013.01); *H04L 9/321* (2013.01); *H04L 9/50* (2022.05)

(58) Field of Classification Search
CPC ..... H04L 9/3247; H04L 9/085; H04L 9/0866; H04L 9/14; H04L 9/321; H04L 9/50
See application file for complete search history.

(56) References Cited

U.S. PATENT DOCUMENTS

| | | | | |
|---|---|---|---|---|
| 8,108,678 B1 * | 1/2012 | Boyen | ............... | H04L 9/0847 713/176 |
| 9,215,076 B1 * | 12/2015 | Roth | ............... | H04L 9/3247 |
| 10,673,625 B1 * | 6/2020 | Behnia | ............... | H04L 9/3073 |
| 2019/0147438 A1 * | 5/2019 | Micali | ............... | G06Q 20/4016 705/71 |
| 2020/0067907 A1 * | 2/2020 | Avetisov | ............... | H04L 63/12 |
| 2020/0112550 A1 * | 4/2020 | Roth | ............... | H04L 63/08 |
| 2020/0228344 A1 * | 7/2020 | Sun | ............... | H04L 9/3247 |

(Continued)

FOREIGN PATENT DOCUMENTS

| | | | | |
|---|---|---|---|---|
| EP | 3789901 A1 * | 3/2021 | ............ | G06F 21/64 |
| GB | 2589636 A * | 6/2021 | ............ | H04L 9/0825 |

(Continued)

OTHER PUBLICATIONS

Gennaro, Rosario, and Steven Goldfeder. "Fast multiparty threshold ECDSA with fast trustless setup." Proceedings of the 2018 ACM SIGSAC Conference on Computer and Communications Security. 2018.

*Primary Examiner* — Darshan I Dhruv
(74) *Attorney, Agent, or Firm* — Maschoff Brennan (57) ABSTRACT

A method of implementing a revocable threshold hierarchical identity-based signature scheme may include receiving an identifier associated with a user. A first secret key based on the identifier may be generated. A string and the identifier may be directed to be posted on a block of a blockchain. A second secret key may be generated using the string, the first secret key, and the identifier. The block that includes the string and the identifier may be signed using the second secret key. A message may be signed using the second secret key to generate a signature. The signature may be provided to a device. The signature may be verifiable by the device using the string and the identifier obtained from the block by the device.

14 Claims, 4 Drawing Sheets

(56) References Cited

U.S. PATENT DOCUMENTS

| | | | |
|---|---|---|---|
| 2020/0322175 A1* | 10/2020 | Chen | H04L 9/3066 |
| 2021/0051023 A1* | 2/2021 | Wei | H04L 9/3231 |
| 2021/0073796 A1* | 3/2021 | Hennebert | G06F 21/64 |
| 2022/0158834 A1* | 5/2022 | Yang | H04L 9/0861 |
| 2022/0247573 A1* | 8/2022 | Li | H04L 9/3252 |
| 2022/0292270 A1* | 9/2022 | Hennebert | H04L 9/50 |
| 2023/0021047 A1* | 1/2023 | Ammar | H04L 9/0825 |

FOREIGN PATENT DOCUMENTS

| | | | | |
|---|---|---|---|---|
| GB | 2597539 A | * | 2/2022 | H04L 9/085 |
| WO | WO-2022037868 A1 | * | 2/2022 | H04L 9/08 |
| WO | WO-2022037869 A1 | * | 2/2022 | H04L 9/08 |
| WO | WO-2023016729 A1 | * | 2/2023 | H04L 9/085 |

* cited by examiner

CROSS-BLOCKCHAIN IDENTITY AND KEY MANAGEMENT

FIELD

The embodiment(s) discussed herein are related to blockchains and identity and key management thereof.

BACKGROUND

Blockchains may include lists of records, called blocks, that are grown and linked via cryptography. Blockchains may be employed to facilitate secure transaction, such as cryptocurrency transactions. Many separate blockchain-based cryptocurrencies currently exist.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of implementing a revocable threshold hierarchical identity-based signature scheme may include receiving an identifier associated with a user. A first secret key based on the identifier may be generated. A string and the identifier may be directed to be posted on a block of a blockchain. A second secret key may be generated using the string, the first secret key, and the identifier. The block that includes the string and the identifier may be signed using the second secret key. A message may be signed using the second secret key to generate a signature. The signature may be provided to a device. The signature may be verifiable by the device using the string and the identifier obtained from the block by the device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings.

DESCRIPTION OF EMBODIMENTS

Conventionally, integration across separate blockchains is limited. Cross-blockchain transactions are available between a limited number of blockchains and such integration is typically ad-hoc. No conventional systems facilitate a dynamic integration of blockchains to facilitate cross-blockchain transactions. Furthermore, conventional blockchain identity management systems may be insufficient for dynamic cross-blockchain integration.

Conventional blockchain integration systems may include identity information hardcoded into the blockchain systems. Such systems may facilitate cross-blockchain transactions between set pairs of blockchains but may not facilitate scaling for dynamic blockchain integration. Furthermore, conventional blockchain integration systems may attempt to rely on an additional, separate blockchain and/or may employ identity proofs that rely on substantial overhead to execute.

Some embodiments include identity management systems and methods that may facilitate dynamic cross-blockchain integration. In some configurations, the identity management systems and methods may not require lookups or blockchain queries for users' public keys on different blockchains. For example, a user's public key for one blockchain may be used to find the user's public key for other blockchains. Additionally, the identity management systems and methods may require minimal computational overhead. For example, computationally expensive actions, such as zero knowledge proofs, may optionally be avoided. Alternately or additionally, the identity management systems and methods may facilitate revocation of keys by users and/or may facilitate users needing to employ their master keys infrequently.

In some embodiments, the identity management systems and methods described in this disclosure may use a revocable threshold hierarchical identity-based signature (RTHIBS) scheme. The RTHIBS scheme may use concepts from other signature schemes. Various signature schemes are now discussed, concepts of which may be used in the RTHIBS scheme.

An identity-based signature scheme may employ setup, key generation, signature, and verification functions as follows:

$\text{Setup}(\ ) \to (msk, pp)$ $\text{Keygen}(msk, id_u) \to sk_u$ $\text{Sign}(sk_u, pp, m) \to \sigma$ $\text{Verify}(pp, id_u, m, \sigma) \to 0/1$ Where msk represents a master secret key, pp represents a public parameter, $id_u$ represents an identification (ID) associated with a user u, $sk_u$ represents a secret key of the user u, m represents a message, and σ represents a signature. The public parameter pp may be published such that it is publicly available. The message m may identify a blockchain transaction or the like. By way of example, the user u may output the ID associated with the user $id_u$, the signature σ, and the message m. A verifier may verify that the signature using the public parameter, the user $id_u$, the signature σ, and the message m.

A hierarchical identity-based signature scheme may further employ a series of key generation functions as follows:

$\text{Setup}(\ ) \to (msk, pp)$ $\text{Keygen}(msk, id_{u_1,i}) \to sk_{u_1,i}$ $\text{Keygen}(sk_{u_1,i}, id_{u_2,i}) \to sk_{u_2,i}$ $\text{Keygen}(sk_{u_{k-1},i}, id_{u_k,i}) \to sk_{u_k,i}$ $\text{Sign}(sk_{u_k,i}, pp, m) \to \sigma$ $\text{Verify}(pp, id_{u_k,i}, m, \sigma) \to 0/1$ Where msk represents a master secret key, pp represents a public parameter, $id_{u1,i}$ represents an ID of a level-1 user $u_{1,i}$, $id_{u2,i}$ represents an ID of a level-2 user $u_{2,i}$, $id_{uk,i}$ represents an ID of a level-k user $u_{k,i}$, $sk_{u1,i}$ represents a secret key of the level-1 user $u_{1,i}$, $sk_{u2,i}$ represents a secret key of the level-2 user $u_{2,i}$, $sk_{u1,i}$ represents a secret key of the level-k user $u_{k,i}$, m represents a message, and σ represents a signature. The setup function may be run by a root-level user. The public parameter pp may be published such that it is publicly available. The message m may identify a blockchain transaction or the like. By way of example, the user $u_{k,i}$ may output the associated ID $id_{uk,i}$, the signature σ, and the message m.

An example threshold signature scheme may employ multiple signatures from multiple users, as follows:

$$Setup(\ )\rightarrow(sk_1,sk_2,\ldots,sk_n,pk)$$

$$Sign(sk_1,m)\rightarrow\sigma_1$$

$$Sign(sk_2,m)\rightarrow\sigma_2$$

$$Sign(sk_n,m)\rightarrow\sigma_n$$

Where $sk_1$ represents a secret key of a user $u_1$, $sk_2$ represents a secret key of a user $u_2$, $sk_n$ represents a secret key of a user $u_n$, pk represents a public key, m represents a message, $\sigma_1$ represents a signature of a user $u_1$, $\sigma_2$ represents a signature of a user $u_2$, and $\sigma_n$ represents a signature of a user $u_n$. The public key pk may be published such that it is publicly available. The message m may identify a blockchain transaction or the like. The various signatures, $\sigma_1$ through $\sigma_n$, may be combined for verification. Verification may succeed in response to a threshold number t out of the n users providing a correct signature.

A threshold hierarchical identity-based signature scheme may employ a series of key generation functions and multiple signatures from multiple users, as follows:

$$Setup(\ )\rightarrow(msk,pp)$$

$$Keygen(msk,id_{u_{1,i}})\rightarrow sk_{u_{1,i}}$$

$$Keygen(sk_{u_{1,i}},id_{u_{2,i}})\rightarrow sk_{u_{2,i}}$$

$$Keygen(sk_{u_{k-1,i}},id_{u_{k,i}})\rightarrow sk_{u_{k,i}}$$

$$Sign(sk_{u_{k,i}},pp,m)\rightarrow\sigma$$

$$Verify(pp,id_{u_{k,i}},m,\sigma)\rightarrow 0/1$$

Where msk represents a master secret key, pp represents a public parameter, $id_{u1,i}$ represents an ID of a level-1 user $u_{1,i}$, $id_{u2,i}$ represents an ID of a level-2 user $u_{2,i}$, $id_{uk,i}$ represents an ID of a level-k user $u_{k,i}$, $sk_{u1,i}$ represents a secret key of the level-1 user $u_{1,i}$, $sk_{u2,i}$ represents a secret key of the level-2 user $u_{2,i}$, $sk_{u1,i}$ represents a secret key of the level-k user $u_{k,i}$, m represents a message, and σ represents a signature. The setup function may be run by n root-level users. The public parameter pp may be published such that it is publicly available. The message m may identify a blockchain transaction or the like. Verification may succeed in response to signing keys being traced back to a threshold number t out of the n root users. The threshold hierarchical identity-based signature scheme may be built using conventional threshold signature schemes.

Embodiments will be explained with reference to the accompanying drawings.

Figure 1:
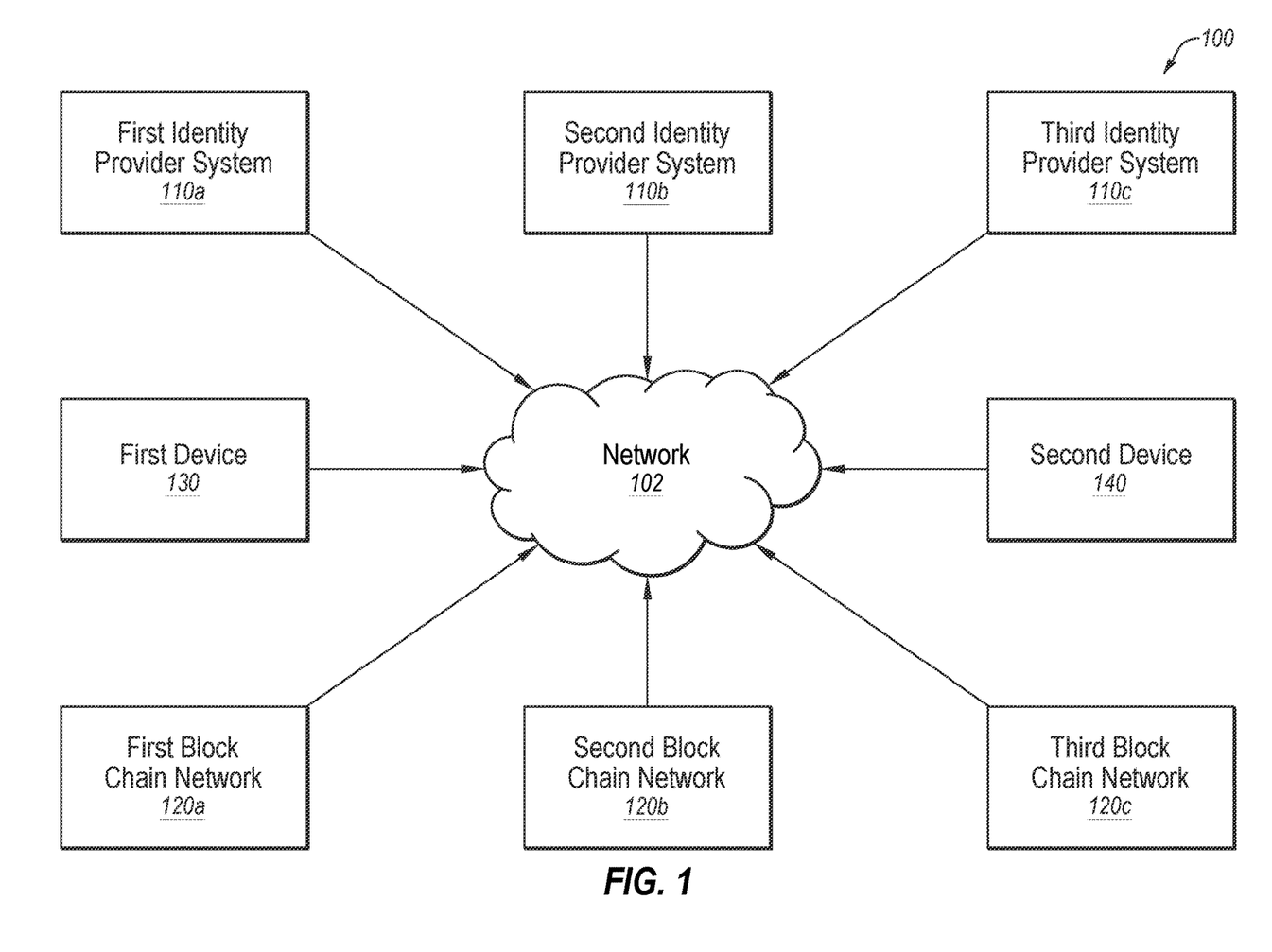
FIG. 1 illustrates an example environment for signature verification

FIG. 1 illustrates an example environment 100 for signature verification. The environment 100 may be arranged in accordance with at least one embodiment described in the present disclosure. The environment 100 may include a network 102, a first identity provider system 110, a second identity provider system 110b, and a third identity provider system 110c, referred to as the identity provider systems 110, a first blockchain network 120, a second blockchain network 120b, and a third blockchain network 120, referred to collectively as blockchain networks 120, a first device 130 and a second device 140.

The network 102 may be configured to communicatively couple the identity provider systems 110, the blockchain networks 120, the first device 130, and the second device 140. In some embodiments, the network 102 may be any network or configuration of networks configured to send and receive communications between systems and devices. In some embodiments, the network 102 may include a wired network, an optical network, and/or a wireless network, and may have numerous different configurations, including multiple different types of networks, network connections, and protocols to communicatively couple devices and systems in the environment 100.

Each of the first and second devices 130 and 140 may include or be any electronic or digital computing device. For example, the first device 130 and the second device 140 may include a desktop computer, a laptop computer, a smartphone, a mobile phone, a tablet computer, or any other computing device that may be used for communication and/or data processing.

In some embodiments, each of the first device 130 and the second device 140 may include memory and at least one processor, which are configured to perform operations as described in this disclosure, among other operations. In some embodiments, each of the first device 130 and the second device 140 may include computer-readable instructions that are configured to be executed by each of the first device 130 and the second device 140 to perform operations described in this disclosure.

Each of the blockchain networks 120 may include a technical infrastructure that provides a blockchain for use by other devices, such as the first device 130 and the second device 140. Each of the blockchain networks 120 may include multiple devices, servers, etc. that may be configured to host the databases that form the blockchain. In these and other embodiments, each of the first device 130 and the second device 140 may be configured to access the blockchains. For example, with respect to one blockchain, the first device 130 and/or the second device 140 may write data to a block of the blockchain, sign a block of the blockchain, and/or read information from a block of the blockchain.

The identity provider systems 110 may be configured to create, maintain, and manage identity information for other systems and also provides authentication services for the other systems. The identity provider systems 110 may include hardware and/or software. For example, each of the identity provider systems 110 may include memory and at least one processor, which are configured to perform operations as described in this disclosure, among other operations. In some embodiments, each of the identity provider systems 110 may include computer-readable instructions that are configured to be executed to perform operations described in this disclosure.

Each of the identity provider systems 110 may be associated with and/or configured to provide identity services for one of the blockchain networks 120. For example, the first identity provider system 110a may be associated with the first blockchain network 120a and be configured to provide identity services for the first blockchain network 120a.

In some embodiments, a revocable threshold hierarchical identity-based signature (RTHIBS) scheme may be implemented in the environment 100 to assist in verification amongst the blockchain networks 120, the first device 130, and the second device 140. Generally speaking, the RTHIBS scheme may include at least three levels in the hierarchy. A root level may include a master secret key, a second level may include a first secret key, and a third level may include a second secret key. The root level may further include a threshold signature scheme, such that no one system/device includes all of the master secret key. Rather, the master secret key may be distributed in master secret key shares. The other levels of the hierarchy may not use the threshold signature scheme. The first secret key of the second level may be held by a single user and the second secret key of the third level may be used by the single user to authenticate messages, blocks, etc.

An example implementation of the RTHIBS scheme with respect to the environment 100 is now provided. Each of the identity provider systems 110, the blockchain networks 120, the first device 130, and the second device 140 may be include instructions that may be used to implement the RTHIBS scheme. For example, this disclosure may provide an indication of various calls that may be used to perform functions of the RTHIBS scheme. In these and other embodiments, the elements of the environment 100 may be configured to perform those calls that they are described as performing. As such, the RTHIBS scheme may be performed in a distributed fashion without assuming any single trusted authority.

To begin, the identity provider systems 110 may perform a setup procedure. In the setup procedure, each of the identity provider systems 110 may receive a share of a master secret key such that none of the identity provider systems 110 include an entirety of the master secret key. In these and other embodiments, the setup procedure may generate a master public key associated with the master secret key such that the master public key and the master secret key may be configured to be used in an asymmetric key encryption scheme. The master public key may be available to all elements in the environment 100 and/or posted on the blockchains of the blockchain networks 120. Other secret key and public key associations described in this disclosure may also be configured to be used in a asymmetric key encryption scheme.

In some embodiments, the first device 130 may be associated with a user. The first device 130 may be used to implement the RTHIBS scheme in behave of the user. Thus, description of a user performing a task may be shorthand for a device, such as the first device 130, that is controlled by the user as performing a task in the RTHIBS scheme.

In some embodiments, the first device 130 may obtain an identifier. The identifier may be associated with the user, such as a random string, an email address, or other identifier. The first device 130 may provide the identifier to the identity provider systems 110. The identity provider systems 110 may use the identifier, a random string, and/or other information to generate a signature using the master secret key shares. The identity provider systems 110 may provide the signatures to the first device 130. The first device 130 may combine the signatures to generate a combined signature. The combined signature may be used with other information, such as the identifier, to generate a first secret key of a second level of the RTHIBS scheme hierarchy. If not enough identity provider systems 110 are available to provide the signatures, the process may not occur because a threshold amount of the master secret key shares may not be used to form the combined signature. This threshold amount may be the threshold portion of the RTHIBS scheme.

The first device 130 may generate a string. In some embodiments, the string may be based on a count of a counter. The first device 130 may direct that the string of the identifier be posted on a block of the each of the blockchains of the first device 130. In these and other embodiments, the first device 130 may be configured to generate a second secret string of a third level of the RTHIBS scheme hierarchy. The first device 130 may generate the second secrete string using calls of the RTHIBS scheme. The second secret string may be generating using the string, the first secret key, and the identifier, among other information. The first device 130 may sign the blocks that include the string and the identifier using the second secret key to authenticate the second secret key. For example, the first device 130 may call a RTHIBS.SignLi function as described herein. Alternately or additionally, a verifier may check the validity of the signature by calling a RTHIBS. Verify function as described herein.

After generation of the second secret key, the first device 130 may use the second secret key for signing messages that may be verified by others using the master public key and the information in the blocks of the blockchain. Because the first device 130 posts the information in all of the blockchains and the second secret key is associated with each of the blockchains through the RTHIBS scheme, trust may be established between users of the different blockchains.

For example, the first device 130 may generate a message that may be signed using the second secret key to generate a signature. The first device 130 may generate the signature using calls of the RTHIBS scheme. The first device 130 may provide the message and the signature to the second device 140.

The second device 140 may obtain the message and the signature may be configured to verify the signature. The second device 140 may obtain the master public key, such as from one of the blockchains. The second device 140 may also be configured to obtain the identifier and the string from a blockchain. The second device 140 may obtain the identifier and the string from a block of the blockchain that is newer than other blocks that may include the identifier. The second device 140 may use the master public key, the identifier, and the string to verify the message/signature. The second device 140 may use calls of the RTHIBS scheme to verify the message/signature. In these and other embodiments, the call to the RTHIBS scheme may include determining if the identifier from the blockchain is valid. In these and other embodiments, the blockchain networks 120 may revoke an identifier if the identifier is comprised to cause the authentication to be performed using the identifier to fail.

In some embodiments, if the second secret keys is compromised, the second secret key may be revoked. In these and other embodiments, a third secret key that is of the third hierarchy level of the RTHIBS scheme may be generated. The third secret key may be generated using a new string and the same identifier. The new string and the identifier may be directed to be posted to other blocks of the blockchain and the process may continue as described above.

In some embodiments, in the RTHIBS scheme may include additional aspects that are able to be performed based on the RTHIBS scheme as described in this disclosure. For example, in the event users' secret keys are compromised, the users may inform verifiers that the secret keys have been compromised. Alternately or additionally, in the RTHIBS scheme, the verifiers may flag all future messages signed by the compromised secret keys.

Furthermore, the user may prove their identity to relevant identity providers through channels off of the blockchains and indicate that the previous secret key should be revoked. The user ID and string associated with the revoked secret key may be added to a deny list. The deny list may be checked during verification. Where a user ID and string is on the deny list, verification of messages signed with a secret key associated with the deny listed user ID and string may fail.

In some embodiments, a master secret key may be revoked. For instance, in response to the master secret key being compromised. Where the user ID is further compromised, the user may prove their identity to relevant identity providers through channels off the blockchains and register a new user ID. The new user ID and a new string, such as a counter reset to an initial value, may be posted to relevant blockchains, which may effectively revoke the previous user ID. The user may sign the previous block including the new user ID and the new string with a secret key generated using the new user ID and new string to authenticate.

Further details regarding the implementation of the RTHIBS is now provided. In some embodiments, the RTHIBS scheme may be based, in part, on a threshold signature scheme and a regular signature scheme. For example, the RTHIBS scheme may employ a setup function, as follows:

$$\text{RTHIBS.Setup}(\ ) \rightarrow (msk_1, \ldots, msk_n, pp)$$

Where $msk_1$ represents a share of master secret key of a root-level (e.g., a level-0) user, $msk_n$ represents a master secret key of an n-th root level user, and pk represents a public key or public parameter.

The RTHIBS scheme may employ a level-1 get key function, as follows:

$$\text{RTHIBS.GetKey}L1(Id_{u_i}, T \subseteq [n], \{msk_u : u \in T\})$$

Where $Id_{u_i,*}$ represents an ID of a first-level user requesting a secret key from a group of root-level users denoted as set T, such as identity provider systems, participating in the RTHIBS scheme and $[n] = \{1, 2, \ldots, n\}$ represents the full set of root-level users participating in the RTHIBS scheme. The element $msk_u$ represents the master secret key shares of the u root-level users belonging to T.

In some configurations, where the number of root-level users in T is less than a threshold t, the RTHIBS.GetKeyL1 function may be aborted. Where the number of root-level users in T is equal to or greater than the threshold t, a string $r_1$ may be generated. In some configurations, the string $r_1$ may be a counter or a random string. Furthermore, a Sig.Keygen( ) function may be executed to generate a public key $pk_1$ and a secret key $sk_1$. In some configurations, the Sig.Keygen( ) function may take a security parameter as an input. Each of the root-level users u that are a member of T may execute a threshold signing function as follows:

$$T\text{Sig.sign}(msk_u, Id_{u_i}, \|r_1\|pk_1) \rightarrow \sigma_u$$

Where the double pipes $\|$ indicate concatenation and $\sigma_u$ represents a signature associated with the root-level user u.

Furthermore, a threshold signature combining function may be executed to combine the $\sigma_u$ signatures as follows:

$$T\text{Sig.combine}(\{\sigma_u : u \in T\}) \rightarrow \sigma_0$$

Where $\sigma_0$ represents the combination of the $\sigma_u$ signatures. Thus, for example, the output of an unaborted RTHIBS level-1 get key function may be as follows:

$$\text{RTHIBS.GetKey}L1(Id_{u_1,*}, T \subseteq [n], \{msk_u : u \in T\}) \rightarrow (\sigma_0, Id_{u_1,*}\|r_1\|pk_1, sk_1) = sk_{u_1,*}$$

Where $sk_{u_1,*}$ represents the level-1 secret key requested by the first-level user from the group of T root-level users.

The RTHIBS scheme may employ a level-1 signing function as follows:

$$\text{RTHIBS.Sign}L1(sk_{u_1,*}, pp, m) \rightarrow ((\sigma_0, \|r_1\|pk_1), \sigma_1) = \sigma_{L1}$$

Where $sk_{u_1,*}$ represents the level-1 secret key output by the RTHIBS.GetKeyL1 function. The element $sk_{u_1,*}$ is parsed as $(\sigma_0, Id_{u_1,*}\|r_1\|pk_1, sk_1)$, pp represents a public parameter, and m represents a message, such as an inter-blockchain transaction or the like. The signature $\sigma_1$ may be generated as follows:

$$\text{Sig.sign}(sk_1, m) \rightarrow \sigma_1$$

For example, the signature $\sigma_1$ may be generated using a signing function of a conventional threshold signature scheme.

The RTHIBS scheme may employ a level-1 verification function as follows:

$$\text{RTHIBS.Verify}L1(pp, Id, m, \sigma_{L1})$$

Where is parsed as $((\sigma_0, Id_{u_1,*}\|r_1\|pk_1), \sigma_1)$. In some configurations, $Id_{u_1,*}\|r_1$ may be compared to a deny list and, in response to the $Id_{u_1,*}\|r_1$ being on the deny list, the RTHIBS.VerifyL1 function may return a failure. In some configurations, if Id does not equal $\perp$, where $\perp$ is not an identity of any participant, the Id may be compared to the $Id_{u_1,*}$ and if the Id is not equal to the $Id_{u_1,*}$, the RTHIBS.VerifyL1 function may return a failure. In some configurations, a conventional identity-based signature scheme verification function may be executed as follows:

$$\text{Sig.Verify}(pk_1, m, \sigma_1)$$

Furthermore, in some configurations, a conventional threshold signature scheme based verification function may be executed as follows:

$$T\text{Sig.Verify}(pp, Id_{u_1,*}\|r_1, \sigma_0)$$

In response to either verification function returning a failure, the RTHIBS.VerifyL1 function may return a failure. Otherwise, the RTHIBS.VerifyL1 function may return a success.

In some embodiments, the RTHIBS scheme may employ a level-i get key function, where $i \geq 2$, as follows:

$$\text{RTHIBS.GetKey}Li(Id, pp, sk_{u_{i-1},*}, r_i) \rightarrow (\sigma_{i-1}, Id\|r_i\|pk_i, sk_i) = sk_{u_i,*}$$

Where the element $sk_{ui-1,*}$ is parsed as $(\sigma_{i-2}, sk_{ui-1,*}\|r_{i-1}\|pk_{i-1}, sk_{i-1})$, $sk_{ui,*}$ represents the secret key for some level-i user *, and $r_i$ represents an i-th string. In some configurations, a conventional identity-based signature scheme key generation function Sig.Keygen( ) may be executed to generate a public key $pk_i$ and a secret key $sk_i$. In some configurations, a signature $\sigma_{i-1}$ may be generated by executing an i–1 level signing function as follows:

$$\text{RTHIBS.Sign}L_{i-1}(sk_{u_{i-1},*}, pp, Id\|r_i\|pk_i) \rightarrow \sigma_{i-1}$$

In some embodiments, the RTHIBS scheme may employ a level-i signing function, where $i \geq 2$, as follows:

$$\text{RTHIBS.Sign}L_i(sk_{u_i,*}, pp, m) \rightarrow ((\sigma_{i-1}, Id_{u_i,*}\|r_i\|pk_i), \sigma_i) = \sigma_{Li}$$

Where the element $sk_{ui,*}$ is parsed as $(\sigma_{i-1}, Id_{ui,*}\|r_i\|pk_i, sk_i)$. In some configurations, the signature $\sigma_i$ may be generated by executing a conventional signature scheme function as follows:

$$\text{Sig.sign}(sk_i, m)$$

Alternately or additionally, the RTHIBS scheme may employ a verification function, which may recursively check levels until it reaches level 1, as follows:

RTHIBS.Verify($pp,Id,m,\sigma$)

Where $\sigma$ is parsed as (($\sigma_{i-1},Id_{ui}\|r_i\|pk_i$), $\sigma_i$). In some configurations, $Id_{ui,*}\|r_i$ may be compared to a deny list and, in response to the $Id_{ui,*}\|r_i$ being on the deny list, the RTHIBS.Verify function may return a failure. In some configurations, if Id does not equal ⊥, the Id may be compared to the $Id_{ui,*}$ and if the Id is not equal to the $Id_{ui,*}$ the RTHIBS.Verify function may return a failure. A conventional signature scheme verification function may be executed as follows:

Sig.Verify($pk_i,m,\sigma_i$)

As noted above, the RTHIBS verification function may be executed recursively as follows:

RTHIBS.Verify($pp,\bot,Id_{ui,*}\|r_i\|pk_i,\sigma_{i-1}$)

In response to a verification function returning a failure, the RTHIBS.Verify function may return a failure. Otherwise, the RTHIBS.Verify function may return a success.

In some embodiments, the RTHIBS scheme may employ a revoke function as follows:

RTHIBS.Revoke($sk_{u_i,*}$)

Where $sk_{ui,*}$ is parsed as ($\sigma_{i-1},Id_{ui,*}\|r_i\|pk_i,sk_i$). The RTHIBS.Revoke function may cause the deny list checked by the RTHIBS.VerifyL1 and RTHIBS.VerifyLi functions to be updated to include $Id_{ui,*}\|r_i$ on the deny list.

Modifications, additions, or omissions may be made to the environment 100 without departing from the scope of the present disclosure. For example, in some embodiments, the environment 100 may include additional devices, such as other devices that may use the RTHIBS scheme and access the blockchains of the blockchain networks 120. Alternately or additionally, some of the elements may be combined. For example, one or more of the identity provider systems 110 may be part of one or more of the blockchain networks 120. Alternately or additionally, one or more of the identity provider systems 110 may provide services for two or more of the blockchain networks 120. Thus, the environment 100 may include more blockchain networks 120 than identity provider systems 110. Alternately or additionally, the first device 130 and the second device 140 may be considered as part of one or more of the blockchain networks 120 as the first device 130 and the second device 140 may post to the blockchains of the blockchain networks 120.

Figure 2:
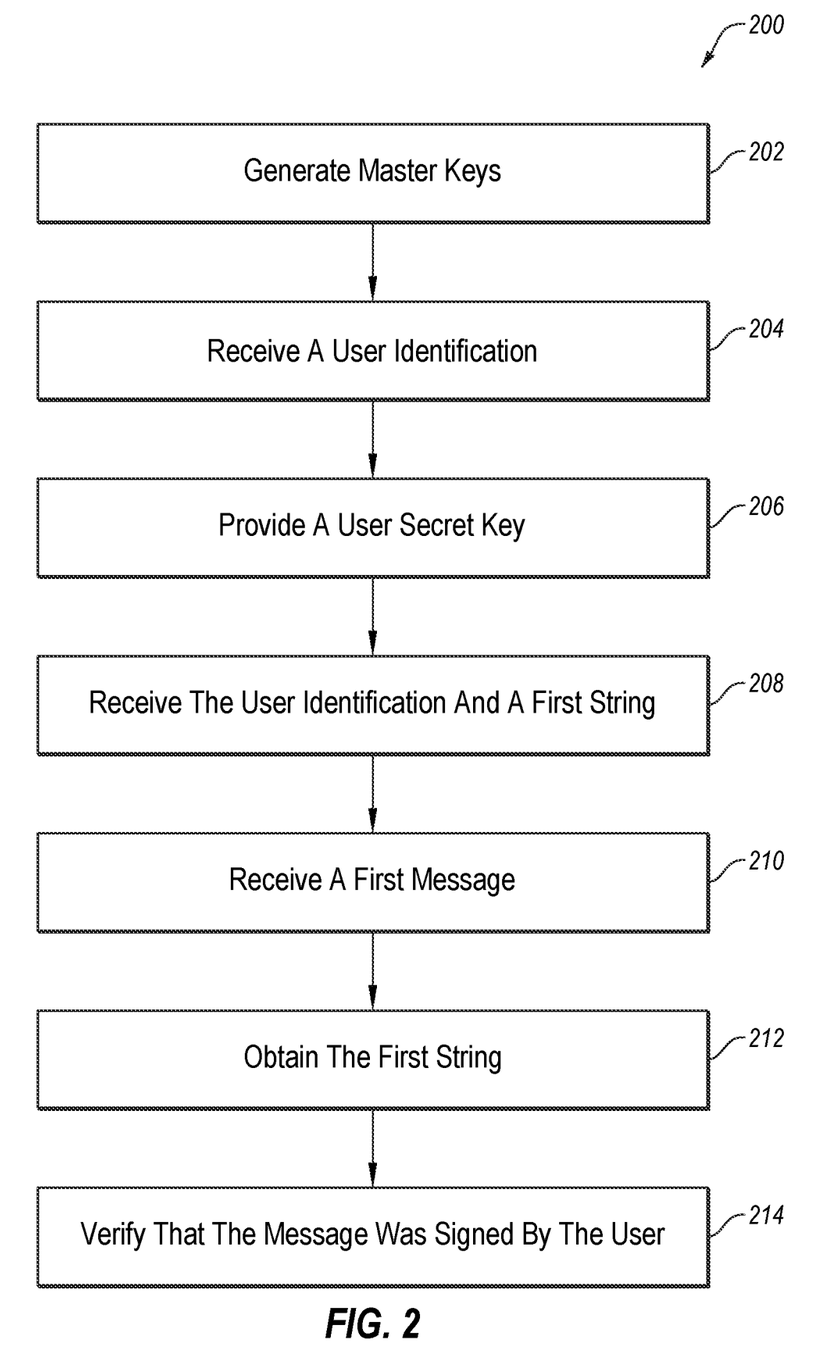
FIG. 2 illustrates a method of implementing a revocable threshold hierarchical identity-based signature scheme.

FIG. 2 illustrates a method 200 of implementing an RTHIBS scheme. The RTHIBS scheme may be implemented by a manager of a blockchain. In some embodiments, the method 200 may be preceded by participating blockchains adopting a standardized security parameter scheme in an effort to facilitate performance of the method 200. The method 200 may facilitate cross-blockchain transactions. The method 200 may facilitate dynamic blockchain integration into the RTHIBS scheme. In some embodiments, the method may be performed by a blockchain entity or the like.

The method 200 may begin at block 202 by generating keys. For example, a share of a master secret key and a master public key may be generated. The share of the master secret key may be associated with a particular blockchain. The share of the master secret key may be one of multiple shares of the master secret key. Each of the shares of the master secret key may be associated with and provided to a different blockchain. The master public key may be published publicly. For instance, the master public key may be posted to the particular blockchain. By way of example, the keys may be generated by blockchain consensus participants of each participating blockchain executing the RTHIBS. Setup function described herein. Thus, the public parameter may be initialized, which the participating blockchains may collectively publish.

The method 200 may continue at block 204 by receiving a user ID. The user ID may be associated with a particular user. In some embodiments, the user ID may include an email address associated with the user. Employing an email address may facilitate verification that the user identification is associated with the owner of the email address.

The method 200 may continue at block 206 by providing a user secret key to the user. The user secret key may be generated and provided to the user in response to receiving the user ID. The user secret key may be associated with the particular blockchain. In some configurations, the user secret key may include a share of a user master secret key. The user may register with other participating blockchains to receive additional shares of the user master secret key. In some configurations, the user secret key may be generated via the RTHIBS.GetKeyL1 function as described herein.

The method 200 may continue at block 208 by receiving the user ID and a first string. By way of example, the first string may be a counter value or an arbitrary string. For instance, the first string may be associated with a counter value of 0. In some configurations, the user ID and the first string may be concatenated to form a public identifier. By way of example, the predefined public identifier may be an email-id∥counter or an email-id∥arbitrary-string, where the double pipes ∥ indicate concatenation and where the arbitrary string may be chosen by the owner of the email identification.

In some configurations, the user may generate one or more hierarchical secret keys from the user master secret key or from previously generated hierarchical secret keys. In some embodiments, the hierarchical secret keys may correspond to the public identifier. In some configurations, the user may generate an additional string for each hierarchical key generated. Where the first string is a counter, each additional string may represent an incremental advancement of the counter. For instance, the first string associated with the user master secret key may equal 0 and a second string associated with a first hierarchical secret key may equal 1.

By way of example, the string may be an arbitrary value or a counter set to an initial value. The user ID and the string may be posted on the applicable blockchains, for instance, as a public identifier. The user may generate a new hierarchical secret key. For instance, the user may employ an RTHIBS.GetKeyL2 function described herein. The user may sign the previous block with the level-2 hierarchical secret key and post the signature such that the level-2 hierarchical secret key may be authenticated.

The user may further sign a message, which may include a cross-blockchain transaction. For instance, the user may employ an RTHIBS.SignL1 function described herein or an RTHIBS.SignLi function described herein as appropriate. The resulting signed message may be provided to a verifier.

The method 200 may continue at block 210 by receiving a first message signed by the user. The signed message may include a transaction, such as a cross-blockchain transaction to be posted to one or more blockchains should a verification succeed.

The method 200 may continue at block 212 by obtaining the first string from the blockchain. For example, where the first string is a counter, the current counter value may be obtained from the blockchain.

The method 200 may continue at block 214 by verifying that the first message was signed by the user. The verification may be based at least in part on the user ID and the first string. For instance, as a public identifier used in the verification function. By way of example, the RTHIBS.VerifyL1 function or the RTHIBS.VerifyLi function described herein may be employed as appropriate to verify that the message was signed by the user. In some embodiments, verifying the first message may include comparing the user ID and the first string to a deny list.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments.

For example, in some embodiments, the method 200 may further include receiving a request to revoke the user secret key. The identity of the entity requesting the revocation may be verified as the associated user. For instance, the request to revoke the user secret key may include proof of the identity of the user. In response to the request to revoke the user secret key, the RTHIBS.Revoke function may be employed. Alternately or additionally, a second user secret key may be provided to the user. In some embodiments, the deny list may be updated to include the user ID and the first string.

Alternately or additionally, the method 200 may further include receiving a second string to be posted on the blockchain. By way of example, the second string may be an incremented counter value or an updated arbitrary string. Optionally, a second message signed by the user may be received. The signed message may include a transaction, such as a cross-blockchain transaction to be posted on one or more blockchains should verification succeed. The second string may be obtained from the blockchain. Furthermore, the second message may be verified as being signed by the user. The verification may be based at least in part on the user ID and the second string. For instance, as a public identifier used in the verification function. By way of example, the RTHIBS.VerifyLi function described herein, where i=2, may be employed to verify that the message was signed by the user. In some embodiments, verifying the second message may include comparing the user ID and the second string to the deny list.

Figure 3:
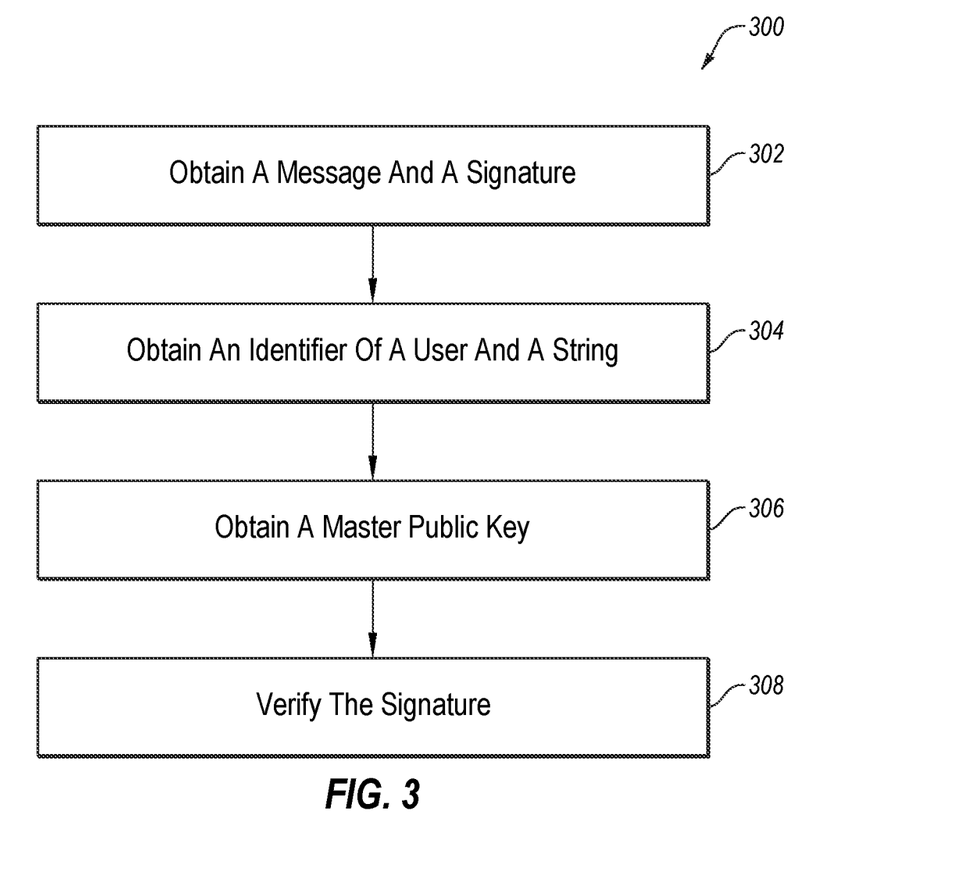
FIG. 3 illustrates a method of signature verification.

FIG. 3 illustrates a method 300 of signature verification. The method 300 may begin at block 302 by obtaining a message and a signature. The signature may be generated using a secret key associated with a user.

The method 300 may continue at block 304 by obtaining an identifier of the user and a string. The identifier of the user and the string may be obtained from a block of a blockchain. The block of the blockchain may be signed using the secret key. In some embodiments, obtaining the identifier and the string from the block of the blockchain may include obtaining the identifier and the string from a newest block of the blockchain that includes the identifier.

The method 300 may continue at block 306 by obtaining a master public key. The master public key may be associated with a master private key. The secret key may be generated based on the master private key. In some embodiments, the secret key may be generated based on signatures generated from a plurality of shares of the master private key and the identifier. One of the plurality of shares of the master private key may be associated with the blockchain.

The method 300 may continue at block 308 by verifying the signature. The signature may be verified using the master public key, the identifier, and the string. In some embodiments, verifying the signature may include determining if the identifier is indicated as invalid.

Figure 4:
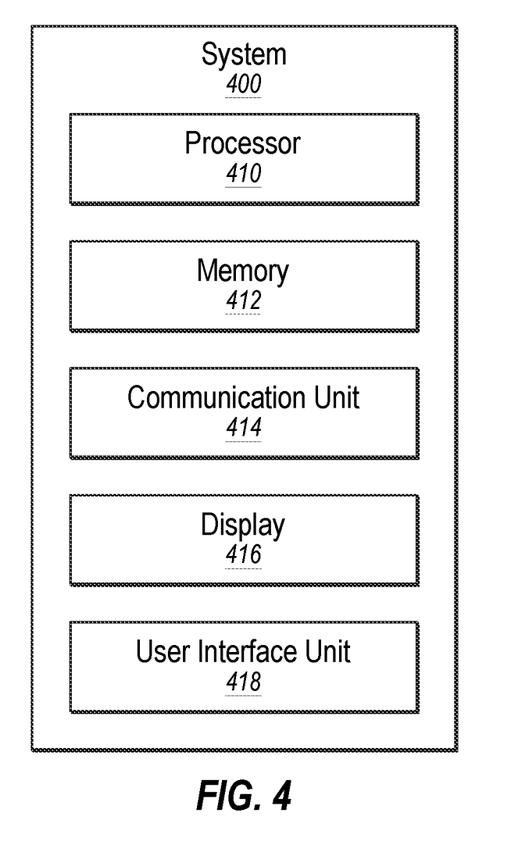
FIG. 4 illustrates an example system that may be used for implementing a revocable threshold hierarchical identity-based signature scheme.

FIG. 4 is a block diagram illustrating an example system 400 that may be used for implementing a revokable threshold hierarchical identity-based signature scheme, according to at least one embodiment of the present disclosure. The system 400 may include a processor 410, memory 412, a communication unit 414, a display 416, and a user interface unit 418, which all may be communicatively coupled. In some embodiments, the system 400 may be used to perform one or more of the methods described in this disclosure.

For example, the system 400 may be used to perform one or more of the operations in the method 200 of FIG. 2 or the method 300 of FIG. 3.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of networks or physical locations that are configured to perform individually or collectively any number of operations described herein. In some embodiments, the processor 410 may interpret and/or execute program instructions and/or process data stored in the memory 412. In some embodiments, the processor 410 may execute the program instructions stored in the memory 412.

For example, in some embodiments, the processor 410 may execute program instructions stored in the memory 412 that are related to task execution such that the system 400 may perform or direct the performance of the operations associated therewith as directed by the instructions. In these and other embodiments, the instructions may be used to perform one or more operations of the method 200 of FIG. 2 or the method 300 of FIG. 3.

The memory 412 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 410 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuuten,* 500 F.3d 1346 (Fed. Cir. 2007). Combinations of the above may also be included within the scope of computer-readable media.

The communication unit 414 may include any component, device, system, or combination thereof that is configured to transmit or receive information over a network. In some embodiments, the communication unit 414 may communicate with other devices at other locations, the same location, or even other components within the same system. For example, the communication unit 414 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 414 may permit data to be exchanged with a network and/or any other devices or systems described in the present disclosure.

The display 416 may be configured as one or more displays, like an LCD, LED, Braille terminal, or other type of display. The display 416 may be configured to present video, text captions, user interfaces, and other data as directed by the processor 410.

The user interface unit 418 may include any device to allow a user to interface with the system 400. For example, the user interface unit 418 may include a mouse, a track pad, a keyboard, buttons, camera, and/or a touchscreen, among other devices. The user interface unit 418 may receive input from a user and provide the input to the processor 410. In some embodiments, the user interface unit 418 and the display 416 may be combined.

Modifications, additions, or omissions may be made to the system 400 without departing from the scope of the present disclosure. For example, in some embodiments, the system 400 may include any number of other components that may not be explicitly illustrated or described. Further, depending on certain implementations, the system 400 may not include one or more of the components illustrated and described.

As indicated above, the embodiments described herein may include the use of a special purpose or general-purpose computer (e.g., the processor 410 of FIG. 4) including various computer hardware or software modules, as discussed in greater detail below. Further, as indicated above, embodiments described herein may be implemented using computer-readable media (e.g., the memory 412 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the scope of the present disclosure.

What is claimed is:

1. A method of signature verification, the method including:
   receiving an identifier associated with a user;
   generating a first secret key based on the identifier;
   directing that a string and the identifier be posted on a first block of a first blockchain;
   directing that the string and the identifier be posted on a second block of a second blockchain;
   generating a second secret key using the string, the first secret key, and the identifier;
   signing the first block that includes the string and the identifier using the second secret key;
   signing the second block that includes the string and the identifier using the second secret key;
   signing a message using the second secret key to generate a signature, the message corresponding to a cross-blockchain transaction between the first blockchain and the second blockchain; and
   providing the signature to a device, wherein the signature is verifiable by the device using the string and the identifier obtained by the device from one or more of the first block or the second block.

2. The method of claim 1, further comprising:
   providing the identifier to an identity provider system, the identity provider system providing identity verification for one or more of the first blockchain or the second blockchain; and
   obtaining a system signature from the identity provider system, the system signature generated using the identifier and a master secret key associated with a master public key,
   wherein the first secret key is generated based on the identifier and the master secret key.

3. The method of claim 2, wherein the signature is verifiable by the device using the string and the identifier obtained from one or more of the first block or the second block by the device and the master public key.

4. The method of claim 2, further comprising:
   obtaining a second system signature from the identity provider system, the second system signature generated using the identifier and the master secret key,
   generating a third secret key based on the identifier and the second system signature; and
   generating a fourth secret key using a second string, the third secret key, and the identifier.

5. The method of claim 1, further comprising:
   providing the identifier to a plurality of identity provider systems, the plurality of identity provider systems providing identity verification for a plurality of blockchains that includes the first blockchain and the second blockchain and each of the identity provider systems including a different share of a master secret key associated with a master public key; and
   obtaining a system signature from each of the plurality of identity provider systems, each of the system signatures generated using the identifier and one of the shares of the master secret key, wherein the first secret key is generated based on the identifier and a combination of the system signatures and wherein the signature is verifiable by the device using the string and the identifier obtained from one or more of the first block or the second block by the device and the master public key.

6. A non-transitory computer-readable medium having encoded therein programing code executable by a processor to perform operations comprising:
   receiving an identifier associated with a user;
   generating a first secret key based on the identifier;
   directing that a string and the identifier be posted on a first block of a first blockchain;
   directing that the string and the identifier be posted on a second block of a second blockchain;
   generating a second secret key using the string, the first secret key, and the identifier;
   signing the first block that includes the string and the identifier using the second secret key;
   signing the second block that includes the string and the identifier using the second secret key;
   signing a message using the second secret key to generate a signature, the message corresponding to a cross-blockchain transaction between the first blockchain and the second blockchain; and
   providing the signature to a device, wherein the signature is verifiable by the device using the string and the identifier obtained by the device from one or more of the first block or the second block.

7. The non-transitory computer-readable medium of claim 6, wherein the operations further comprise:
   providing the identifier to an identity provider system, the identity provider system providing identity verification for one or more of the first blockchain or the second blockchain; and
   obtaining a system signature from the identity provider system, the system signature generated using the identifier and a master secret key associated with a master public key,
   wherein the first secret key is generated based on the identifier and the master secret key.

8. The non-transitory computer-readable medium of claim 7, wherein the signature is verifiable by the device using the string and the identifier obtained from one or more of the first block or the second block by the device and the master public key.

9. The non-transitory computer-readable medium of claim 7, wherein the operations further comprise:
   obtaining a second system signature from the identity provider system, the second system signature generated using the identifier and the master secret key,
   generating a third secret key based on the identifier and the second system signature; and
      generating a fourth secret key using a second string, the third secret key, and the identifier.

10. The non-transitory computer-readable medium of claim 6, wherein the operations further comprise:
prov020ding the identifier to a plurality of identity provider systems, the plurality of identity provider systems providing identity verification for a plurality of blockchains that includes the first blockchain and the second blockchain and each of the identity provider systems including a different share of a master secret key associated with a master public key; and
obtaining a system signature from each of the plurality of identity provider systems, each of the system signatures generated using the identifier and one of the shares of the master secret key, wherein the first secret key is generated based on the identifier and a combination of the system signatures and wherein the signature is verifiable by the device using the string and the identifier obtained from one or more of the first block or the second block by the device and the master public key.

11. A method of signature verification, the method including:
obtaining a message and a signature, the signature generated using a secret key associated with a user, the message including a cross-blockchain transaction designated for being posted on multiple different blockchains;
obtaining an identifier of the user and a string from a block of a blockchain of the multiple different blockchains, wherein the block of the blockchain is signed using the secret key;
obtaining a master public key, the master public key associated with a master private key, the secret key generated based on the master private key; and
verifying the signature using the master public key, the identifier, and the string, wherein the message is posted on each of the multiple different blockchains in response to the signature being verified.

12. The method of claim 11, wherein obtaining the identifier and the string from the block of the blockchain includes obtaining the identifier and the string from a newest block of the blockchain that includes the identifier.

13. The method of claim 11, wherein the secret key is generated based on signatures generated from a plurality of shares of the master private key and the identifier, one of the plurality of shares of the master private key associated with the blockchain.

14. The method of claim 11, wherein verifying the signature using the master public key, the identifier and the string include determining in response to the identifier being indicated as invalid.

* * * * *